Sept. 16, 1941.  F. A. WARD  2,256,131
MULTIMOTORED VEHICLE
Filed May 26, 1939  2 Sheets-Sheet 1

INVENTOR.
Frederick A. Ward
BY Whittemore Hulbert & Belknap
ATTORNEYS

Sept. 16, 1941.  F. A. WARD  2,256,131
MULTIMOTORED VEHICLE
Filed May 26, 1939  2 Sheets-Sheet 2
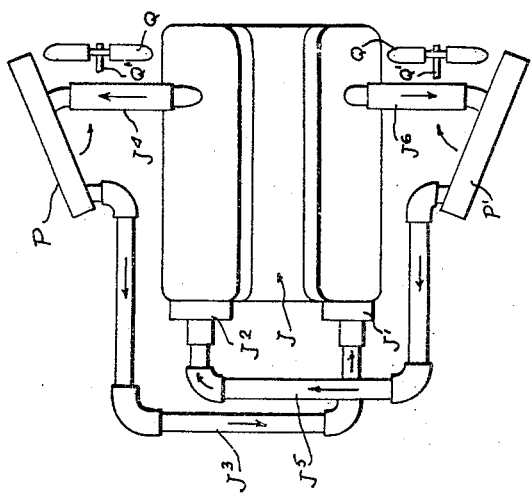
Fig. 5.
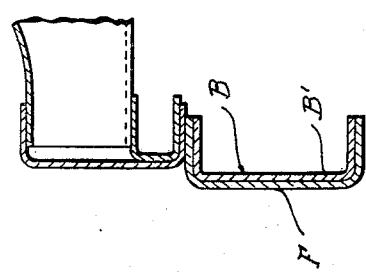
Fig. 6.
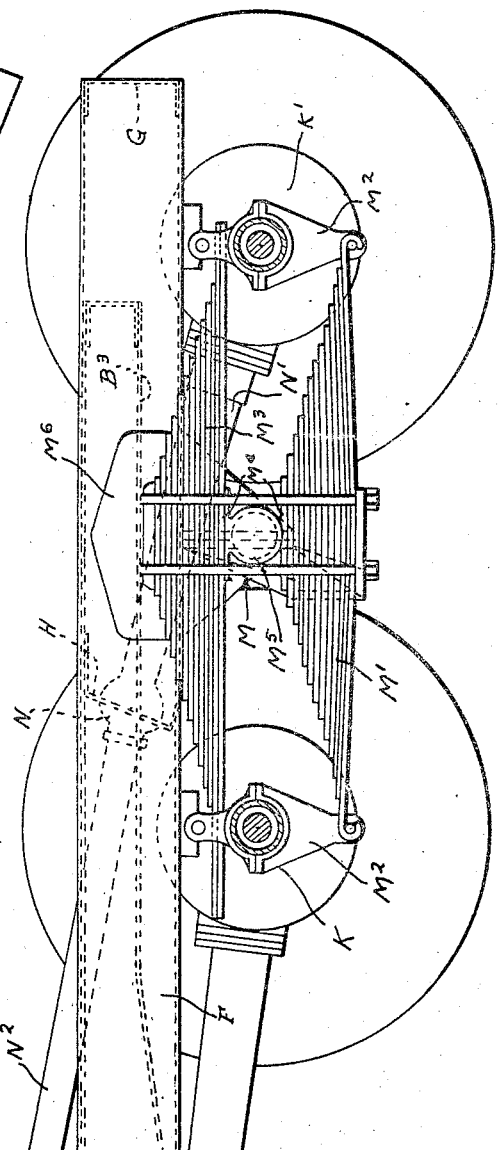
Fig. 2.
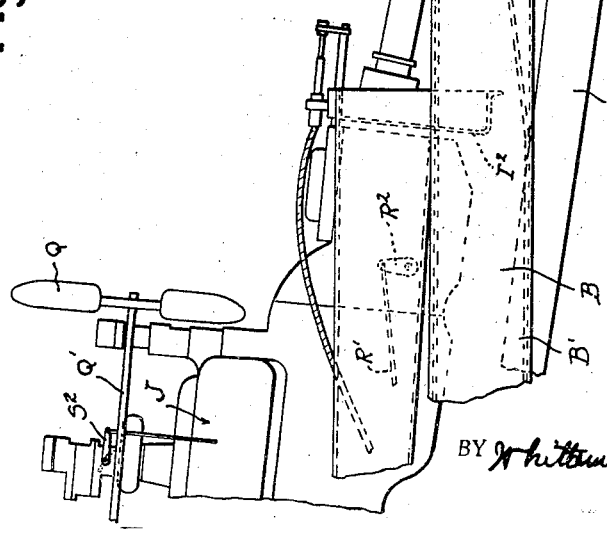
INVENTOR.
Frederick A. Ward
BY Whittemore Halbert & Belknap
ATTORNEYS Patented Sept. 16, 1941

2,256,131

UNITED STATES PATENT OFFICE 2,256,131

MULTIMOTORED VEHICLE

Frederick A. Ward, Highland Park, Mich., assignor to Gear Grinding Machine Company, Hamtramck, Mich., a corporation of Michigan Application May 26, 1939, Serial No. 276,009

5 Claims. (Cl. 180—22)

The invention relates to multimotored commercial vehicles of that type in which a standard construction of truck having a single internal combustion engine motor unit and a single driving axle, is provided with a second similar motor unit and an additional driving axle, thereby greatly increasing the available power. One objection to such constructions is that the second motor and its connections occupies a large amount of space that would otherwise be available for the pay load. Consequently, as there are limits to the permissible dimensions of the vehicle the increased power is obtained at a sacrifice of load carrying capacity.

It is the object of the instant invention to obtain a construction which while still using chiefly standard parts, arranges the two motors more compactly to leave more space for the pay load. It is a further object to obtain this arrangement without sacrifice in efficiency of either motor. With these and other objects in view, the invention consists in the construction as hereinafter set forth.

In the drawings:

Figure 2 is an enlarged view of a portion of Figure 1;

Figure 5 is a plan view illustrating the water cooling system;

Figure 6 is a cross section through one of the sides of the frame.

Certain vehicle manufacturers are producing and marketing light single-motored trucks and the various individual units thereof, such as motors, driving axles, torque tubes, etc. My improved construction is built largely of such units which, however, are so arranged and organized as to obtain the advantageous results above referred to.

Figure 4:
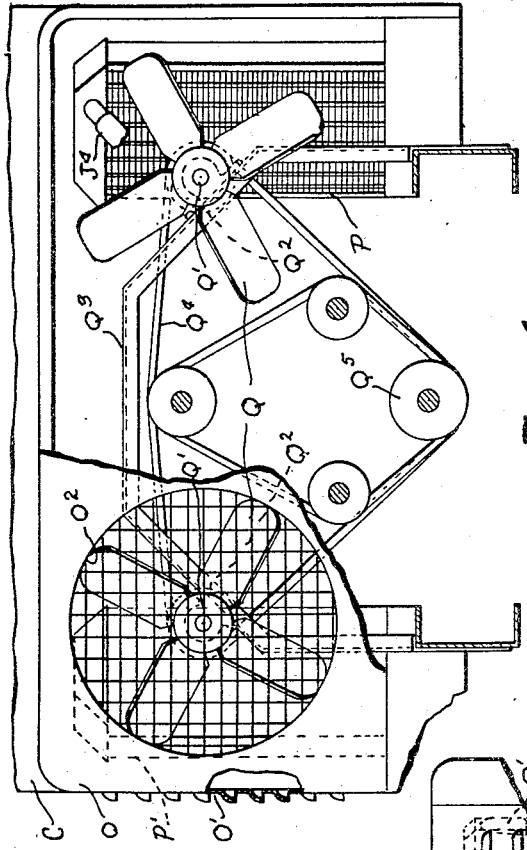
Figure 4 is a rear elevation of the housing for the rear motor, illustrating the air cooling system.
Figure 3:
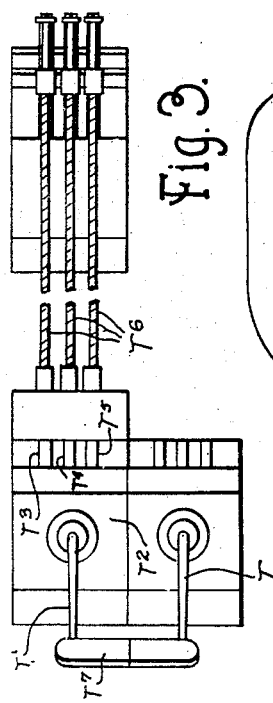
Figure 3 is a plan view showing the gear shifting means.
Figure 1:
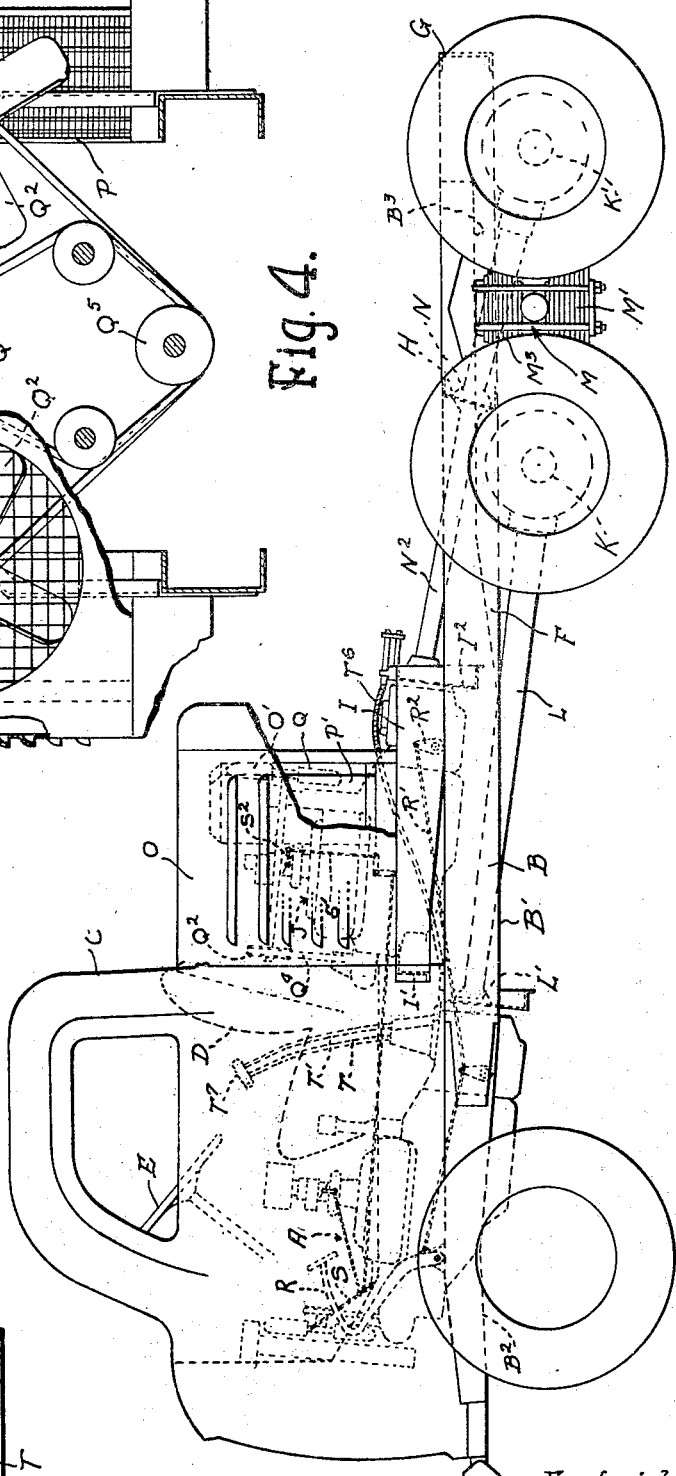
Figure 1 is a sectional side elevation partly in diagram, showing my improved construction of multimotored vehicle.

As shown in Figure 1, A is the motor unit of the original truck construction including a multi-cylindered V-type internal combustion engine, clutch, transmission gearing and other necessary accessories. B is the chassis frame formed of channel bar side sills, the central portions B' thereof being of greatest depth with tapered portions B² and B³ extending respectively forward and rearward therefrom. C is the cab which is mounted on the frame over the motor A and enclosing the driver's seat D, steering wheel E and other necessary controls.

Utilizing the parts assembled as just described, my improved truck includes reinforcing and extension side sills F. These also are formed of channel bars of such cross section as to telescopically engage the portions B' of the sills B outside the latter and to extend rearward therefrom over the portions B³ and beyond the rear ends thereof. The sills F at their rear ends are connected by a cross sill G and are also connected by an intermediate cross sill H. Resting upon and extending upward above the forward portions of the sills F and in rear of the cab C are channel members I connected to each other by cross sills I' and I², together forming a support for a second motor unit J. This may be a duplicate of the first motor unit, but because of its mounting is arranged at a greater elevation on the chassis frame.

The standard truck is provided with a single driving axle assembly K having a forwardly extending torque tube L for containing the propeller shaft and with a universal joint L' at its forward end. These parts are all utilized in my improved construction, but in addition thereto I employ a second duplicate axle assembly K' and support the frame on the two axles through the medium of a walking beam spring assembly M. As shown, the lower spring M' of this assembly is pivotally connected at its opposite ends with supporting brackets M² on the respective axles and the upper spring M³ is slidably supported upon the axles. This permits the axle K to travel during the deflection of the springs through an arcuate path that is concentric with the universal joint L'. Also, the axle K' is permitted to travel through an arcuate path which is concentric with a universal joint N at the forward end of a torque tube N' and mounted in the cross sill H, which latter is located somewhat in rear of the forward axle K. A tubular housing N² extends forward from the universal joint N to the second motor assembly and together with the tube N' encloses the propeller shaft connecting the second motor J with the rear axle K'. The springs M' and M³ are centrally connected by bearings M⁴ engaging trunnions M⁵ secured to depending brackets M⁶ on the extension sills F.

With the construction as thus far described, it will be understood that the second motor J can be positioned immediately in rear of the cab C and on account of its greater elevation will provide working clearance between the tube N and the forward axle K. This arrangement reduces the pay load area only by the length of said motor. However, inasmuch as the motor is directly in rear of the cab which obstructs direct access of air to its forward end, the cooling system for said motor must be changed. With this in view, I have placed a hood O for enclosing the motor J directly in rear of and of the same width as the cab C, forming the sides of this hood with louvres or other openings. Two radiators P, P' are used, which, as specifically shown in Figure 5, are arranged upon opposite sides of the motor J at an oblique angle with their rear ends adjacent to the louvered sides O' of the hood O. This hood has a pair of grilled openings O² on its rear side on opposite sides of the center thereof. Exhaust fans Q are positioned adjacent to these openings, being mounted upon shafts Q', which at their forward ends have drive pulleys Q². The shafts are mounted upon a frame Q³ and the pulleys Q² are driven by a belt Q⁴ from the standard fan drive pulley Q⁵ of the motor J. This assembly will thus cool the motor J by air entering through the louvers O' passing through the obliquely arranged radiators P, and finally ejected by the exhaust fans Q through the rear grills O².

To equalize the cooling effect in the separate cylinder banks of the V-motor, the cooling liquid is passed in series through the radiators and the two banks. Thus as shown, water pumps J' and J² are arranged adjacent respectively to the two banks of the motor, and the suction pipe of the pump J' on one side is connected through a conduit J³ with the base of the radiator P on the opposite side. This radiator is connected by a conduit J⁴ with the top of the bank adjacent thereto. In the same manner the suction conduit J⁵ of the pump J² is connected with the base of the radiator P' on the opposite side and the top of this radiator is connected by a conduit J⁶ with the top of the adjacent bank. This completes the circuit so that the water discharged from the jacket of each bank passes through the adjacent radiator and then into the bottom of the jacket of the opposite bank from which it passes through the second radiator and connected conduit into the base of the jacket of the first bank. As a consequence, any difference in the cooling effect of the radiators due for instance to the direction of the wind, will have no effect in cooling one bank of the cylinders more than the other bank.

All of the controls for the two motors A and J are located in the cab and include a single pedal R for controlling the clutches of both motors, a single accelerator pedal S for controlling the throttles of both motors, the usual gear shift lever T for controlling the transmission of the motor A, and a second gear shift lever T' for controlling the transmission of the motor J. There is also a starter for each motor (not shown) of the type controlled by a push button located on the instrument board or in any other convenient place. The clutch pedal R primarily controls the clutch of the motor A, but it is connected through a rod R' with a clutch operating lever R² for the motor J. In the same way the accelerator pedal S directly controls the throttle of the motor A and through a connecting rod S' operates the throttle lever S² for the motor J. The gear shift lever T' is arranged adjacent to the gear shift lever T, but is connected to a control box T³ for alternative operation of the shifter rods T³, T⁴ and T⁵. The transmission for the motor J has corresponding shifter rods which are respectively coupled by push and pull cables T⁶ to the rods T³, T⁴ and T⁵. Thus the operation of the lever T' will control the transmission of the motor J in the same manner that the operation of the lever T will control the transmission of the motor A. There is also preferably provided a coupler bar T⁷ on the lever T', which may be engaged with the lever T whenever it is desired to operate both levers simultaneously and correspondingly.

*Operation*

With the construction as above described, it will be obvious that the operator can, at will, use either of the motors A and J alternatively, or where increased power is desired both motors may be operated simultaneously. The controls are the usual standard controls, the only selection required being to operate the gear shift lever of the particular engine which is being used. When both engines are in operation, then the coupling bar T⁷ is used so that the operator simultaneously shifts the gears correspondingly in the two transmissions. Each motor is started in the usual way, by turning on its ignition switch and pressing the starter push button switch. It may be cut out at any time by opening the ignition switch.

What I claim as my invention is:

1. The combination with a truck including a chassis, a single motor unit mounted thereon, a cab arranged above said motor unit, a single rear driving axle, and a propeller shaft between said motor unit and axle, of a second motor unit mounted on said chassis in rear of, in close proximity to and at a higher level than said first mentioned motor unit, a second driving axle, a propeller shaft connecting said second motor unit and second axle arranged to provide working clearance over the first axle, a hood enclosing said second motor unit in rear of said cab having apertures in the sides thereof for entrance of cooling air and apertures in the rear wall for the exit of air, a plurality of radiators arranged within the hood in rear of the forward end of said motor unit and on opposite sides thereof, and means also in rear of the forward end of said second motor unit for propelling air through said radiators.

2. The combination with a truck including a chassis, a single motor unit mounted thereon, a single rear driving axle and a propeller shaft between said motor unit and axle, of a second two-bank motor unit mounted on said chassis in rear of, in close proximity to and at a higher level than said first mentioned motor unit, a second driving axle in rear of the aforesaid driving axle, a propeller shaft connecting said second motor unit and second axle arranged to provide working clearance over said first axle, a cab over said first motor unit, a hood in rear of said cab enclosing said second motor unit said hood having apertured sides for the entrance of cooling air and an apertured rear wall for the exit of air, a pair of radiators arranged within said hood in rear of the forward end of said second motor unit and on opposite sides thereof, means for propelling air entering through opposite sides of said hood respectively through said radiators, and a cooling system arranged to propel a liquid cooling agent successively through one bank the radiator on the same side, the second bank the radiator on the side thereof and back to the first bank, whereby the cooling effect in the two banks is always equal.

3. The combination with a truck including a chassis, a single motor unit mounted thereon, a cab arranged above said motor unit, a single rear driving axle and a propeller shaft between said motor unit and axle, of a second motor unit mounted on said chassis in rear of and in close proximity to and at a higher level than said first mentioned motor unit, a second driving axle, a propeller shaft connecting said second motor unit and said axle arranged to provide working clearance over the first axle, a hood enclosing said second motor unit in rear of said cab having apertures in the side walls thereof for the entrance of cooling air and apertures in the rear wall for the exit of air, a radiator arranged within said hood in rear of the forward end of said motor unit, and means also in rear of the forward end of said second motor unit for propelling air through said radiator.

4. The combination with a truck including a chassis, a single motor unit mounted thereon, a single driving axle and a propeller shaft between said motor unit and axle, of a second two-bank motor unit mounted on said chassis in rear of and in close proximity to and at a higher level than said first mentioned motor unit, a second driving axle in rear of the aforesaid driving axle, a propeller shaft connecting said second motor unit and said second axle arranged to provide working clearance over said first axle, a cab over said first motor unit, a hood in rear of said cab enclosing said second motor unit, said hood having apertured sides for the entrance of cooling air and an apertured rear wall for the exit of air, a pair of radiators arranged within said hood, means for propelling air entering through opposite sides of said hood respectively through said radiators, and a cooling system arranged to propel a liquid cooling agent successively through the two banks and the two radiators whereby the cooling effect in each bank is the same.

5. A truck comprising a chassis frame, a cab, a single motor unit mounted on said frame forward of said cab and including a change speed transmission and a shift lever, the latter being within the cab, a single driving axle, a propeller shaft between said motor unit and axle, a second motor unit mounted on said frame adjacent to and immediately in rear of said cab and including a change speed transmission, a second driving axle in rear of the aforesaid driving axle, a propeller shaft connecting said second motor unit with said second axle arranged to provide clearance between the same and said first axle, a second shift lever within said cab adjacent to said first shift lever, and mechanism actuated by said second shift lever connecting with said second change speed transmission for operating the same.

FREDERICK A. WARD.